(12) United States Patent
Shimono et al.

(10) Patent No.: US 9,573,775 B2
(45) Date of Patent: Feb. 21, 2017

(54) POWDER SUPPLY APPARATUS AND POWDER SUPPLY METHOD

(75) Inventors: Kimihiro Shimono, Uozu (JP);
Takahiro Takeda, Uozu (JP);
Kazutoshi Teraoka, Uozu (JP);
Fumihito Kasagi, Uozu (JP)

(73) Assignee: DIAMOND ENGINEERING CO., LTD., Uozu-shi (JP)

( * ) Notice: Subject to any disclaimer, the term of this patent is extended or adjusted under 35 U.S.C. 154(b) by 145 days.

(21) Appl. No.: 13/984,962

(22) PCT Filed: Feb. 20, 2012

(86) PCT No.: PCT/JP2012/054024
§ 371 (c)(1),
(2), (4) Date: Aug. 12, 2013

(87) PCT Pub. No.: WO2012/115062
PCT Pub. Date: Aug. 30, 2012

(65) Prior Publication Data
US 2013/0320049 A1    Dec. 5, 2013

(30) Foreign Application Priority Data

Feb. 21, 2011 (JP) .................................. 2011-035250

(51) Int. Cl.
| | |
|---|---|
| *B65G 51/16* | (2006.01) |
| *B65G 53/16* | (2006.01) |
| *B65G 53/22* | (2006.01) |
| *B65G 53/66* | (2006.01) |
| *C21B 5/00* | (2006.01) |
| *F27D 3/16* | (2006.01) |

(52) U.S. Cl.
CPC .............. *B65G 53/16* (2013.01); *B65G 53/22* (2013.01); *B65G 53/66* (2013.01); *C21B 5/003* (2013.01); *C21B 5/008* (2013.01); *F27D 3/16* (2013.01)

(58) Field of Classification Search
CPC ....................................................... B65G 51/16
USPC ....... 406/46, 136, 137, 138, 144, 12, 26, 27; 222/195, 400.5
See application file for complete search history.

(56) References Cited

U.S. PATENT DOCUMENTS

| | | | | |
|---|---|---|---|---|
| 2,192,287 A | * | 3/1940 | Goebels ................. | B65G 53/22 406/128 |
| 2,518,811 A | * | 8/1950 | Nicholson ....................... | 406/41 |
| 3,345,111 A | * | 10/1967 | Bies ...................... | B05B 7/1404 406/138 |
| 3,432,208 A | * | 3/1969 | Draper et al. .................. | 406/93 |

(Continued)

FOREIGN PATENT DOCUMENTS

| | | |
|---|---|---|
| CN | 200940041 | 8/2007 |
| JP | 05-147735 | 6/1993 |

(Continued)

*Primary Examiner* — Joseph Dillon, Jr.
(74) *Attorney, Agent, or Firm* — Greenblum & Bernstein, P.L.C.

(57) ABSTRACT

A Powder feeding system for feeding powder in a feed tank via a valve for powder downstream of the feed tank and through a powder delivery pipe, the Powder feeding system including: a powder fluidizing portion provided in the feed tank and configured to introduce fluidizing gas for fluidizing the powder; and a powder refluidizing portion provided between the powder fluidizing portion and the valve for powder and configured to introduce refluidizing gas for refluidizing the powder.

7 Claims, 3 Drawing Sheets

(56) References Cited

U.S. PATENT DOCUMENTS

| | | | |
|---|---|---|---|
| 3,582,046 A * | 6/1971 | Mueller et al. | 366/106 |
| 3,619,011 A * | 11/1971 | Doble | 406/129 |
| 4,049,394 A * | 9/1977 | Gernhardt et al. | 48/62 R |
| 4,059,311 A * | 11/1977 | Spitzer et al. | 406/93 |
| 4,108,500 A * | 8/1978 | Stamer | 406/12 |
| 4,200,413 A * | 4/1980 | Fitch | 406/49 |
| 4,502,819 A * | 3/1985 | Fujii et al. | 406/14 |
| 5,071,289 A * | 12/1991 | Spivak | 406/11 |
| 5,285,735 A | 2/1994 | Motoi et al. | |
| 5,685,640 A * | 11/1997 | Goedicke et al. | 366/107 |
| 6,135,317 A * | 10/2000 | Ruelle et al. | 222/1 |
| 6,257,804 B1 * | 7/2001 | Gathmann | 406/68 |
| 6,994,497 B1 * | 2/2006 | Eriksson et al. | 406/124 |
| 7,284,679 B2 * | 10/2007 | Zill et al. | 222/1 |
| 8,936,416 B2 * | 1/2015 | Stutz et al. | 406/132 |
| 9,296,570 B2 * | 3/2016 | Shimono et al. | F23K 3/02 |
| 2005/0244193 A1 | 11/2005 | Amano et al. | |
| 2010/0111616 A1 * | 5/2010 | Gilbert et al. | 406/46 |
| 2014/0203038 A1 * | 7/2014 | Shimono et al. | F27D 3/18 |
| | | | 222/1 |
| 2014/0234034 A1 * | 8/2014 | Shimono et al. | F23K 3/02 |
| | | | 406/127 |
| 2015/0021358 A1 * | 1/2015 | Shimono et al. | F23K 3/02 |
| | | | 222/55 |

FOREIGN PATENT DOCUMENTS

| | | |
|---|---|---|
| JP | 6-115690 | 4/1994 |
| JP | 7-026271 | 6/1995 |
| JP | 11-79395 | 3/1999 |
| JP | 2006-47972 | 2/2006 |

* cited by examiner

POWDER SUPPLY APPARATUS AND POWDER SUPPLY METHOD

TECHNICAL FIELD

The present invention relates to a Powder supply apparatus and a Powder supply method, and more particularly to a Powder supply apparatus and a Powder supply method capable of stably supplying powder.

BACKGROUND ART

Combustion furnaces for burning pulverized fuel such as pulverized coal fed from Powder supply apparatus is known as combustion furnaces used in blast furnace facilities, thermal power plants, and the like. In such a combustion furnace, pulverized fuel is sprayed thereinto together with air and burnt therein. Such a burning method using pulverized coal is widely used because coal itself is highly combustible.

A gas-carried Powder supply apparatus that conveys pulverized fuel with carrier gas is known as a Powder supply apparatus for supplying pulverized fuel to the combustion furnace. In such a Powder supply apparatus, pulverized fuel in a feed tank is fed to a powder delivery pipe and conveyed by the carrier gas therein. The supply rate of the pulverized fuel into the powder delivery pipe may be controlled according to the aperture of a valve for powder provided near an outlet in a bottom portion of a feed tank.

In addition, in order to allow powder to be easily fed from the feed tank to outside thereof, a Powder supply apparatus in which fluidizing gas is introduced into a feed tank and powder in the feed tank is fluidized by the fluidizing gas is known.

In a Powder supply apparatus disclosed in Patent Document 1 listed below, fluidizing gas is introduced into a feed tank as mentioned above and fluidized powder is fed from the feed tank. The supply rate of the fluidized powder is controlled according to the aperture of a valve for powder as described above.

CITATION LIST

Patent Document

[Patent Document 1] Japanese Patent Application Laid-Open No. 05-147735

SUMMARY OF INVENTION

Objects to be Achieved by the Invention

When fluidizing gas is introduced into a feed tank as in the Powder supply apparatus disclosed in Patent Document 1 described above, obstruction in the valve for powder is less likely to occur than a case where fluidizing gas is not introduced. However, a Powder supply apparatus in which obstruction in a valve for powder is still less likely to occur and which is capable of supplying powder stably has been desired.

It is therefore an object of the present invention to provide a Powder supply apparatus and a Powder supply method capable of stably supplying powder.

Means for Achieving the Objects

To achieve the aforementioned object, a Powder supply apparatus according to the present invention is a Powder supply apparatus for supplying powder in a feed tank to outside of the feed tank via a valve for powder downstream of the feed tank and through a powder delivery pipe, the Powder supply apparatus including: a powder fluidizing portion provided in the feed tank and configured to introduce fluidizing gas for fluidizing the powder; and a powder refluidizing portion provided between the powder fluidizing portion and the valve for powder and configured to introduce refluidizing gas for refluidizing the powder.

According to such a Powder supply apparatus, the powder fluidized by the fluidizing gas is further fluidized (refluidized) before entering the valve for powder, and the refluidized powder is introduced into the valve for powder. Therefore, the powder introduced into the valve for powder has high fluidity, and it is possible to prevent the valve for powder from being obstructed by the powder. As a result, according to the Powder supply apparatus of the present invention, it is possible to stably supply powder.

Preferably, in the Powder supply apparatus, the valve for powder is provided in the powder delivery pipe, and the powder refluidizing portion is provided at a portion of the powder delivery pipe between the powder fluidizing portion and the valve for powder.

In general, a valve can be easily provided in a middle portion of a pipe, and the valve for powder can therefore be easily provided in the powder delivery pipe in the manufacture of the Powder supply apparatus. Even fluidized powder, however, becomes lower in fluidity when entering the powder delivery pipe from the feed tank and obstruction becomes more likely to occur in the valve for powder. According to the Powder supply apparatus, since the powder is refluidized in the powder delivery pipe, it is therefore possible to prevent the valve for powder from being obstructed.

Preferably, in the Powder supply apparatus, the powder refluidizing portion is connected to the valve for powder.

According to the Powder supply apparatus, the powder refluidizing portion and the valve for powder are adjacent to each other, and the distance between the powder refluidizing portion and the valve for powder can be minimized. Since powder having high fluidity can therefore be introduced through the valve for powder, it is possible to suitably prevent obstruction in the valve for powder and to supply powder more stably.

Preferably, in the Powder supply apparatus, the amount of the introduced refluidizing gas is determined on the basis of the aperture of the valve for powder.

As a result of determining the amount of the introduced refluidizing gas in this manner, it is possible to change the amount of the introduced refluidizing gas in accordance with the likeliness of occurrence of obstruction when the likeliness of occurrence of obstruction changes with the aperture of the valve for powder, and to more suitably prevent obstruction.

Preferably, in the Powder supply apparatus, the amount of the introduced refluidizing gas changes inversely with a change in the aperture of the valve for powder.

Specifically, a smaller amount of the refluidizing gas is introduced as the aperture of the valve for powder is larger while a larger amount of the refluidizing gas is introduced as the aperture of the valve for powder is smaller. As an example of such introduction of the refluidizing gas, the amount of the introduced refluidizing gas changes in inverse proportion to the aperture of the valve for powder. In general, obstruction due to the powder is more likely to occur when the aperture of the valve for powder is smaller while obstruction due to the powder is less likely to occur when the aperture of the valve for powder is larger. As a result of determining the amount of the introduced refluidizing gas on the basis of the aperture of the valve for powder, it is thus possible to prevent an unnecessarily large amount of the refluidizing gas from being introduced.

Preferably, the Powder supply apparatus further includes a carrier gas supply configured to introduce carrier gas into the powder delivery pipe.

According to the Powder supply apparatus, powder can be easily conveyed by the carrier gas.

When the carrier gas is introduced, preferably, the fluidizing gas, the refluidizing gas, and the carrier gas are the same type of gas.

When the carrier gas, the fluidizing gas and the refluidizing gas are the same type of gas, it is not necessary to provide a plurality of types of gas and it is not necessary to take the properties of the respective types of gas into consideration, the carrier gas, the fluidizing gas, and the refluidizing gas can therefore be made to flow simply.

Furthermore, when the fluidizing gas, the refluidizing gas, and the carrier gas are the same type of gas, preferably, part of the carrier gas is supplied as the fluidizing gas to the powder fluidizing portion and as the refluidizing gas to the powder refluidizing portion.

As a result of introducing the fluidizing gas and the refluidizing gas in this manner, one source of gas generation suffices, which can simplify the structure of the Powder supply apparatus.

Alternatively, when the carrier gas is introduced, preferably, the fluidizing gas and the refluidizing gas are a type of gas different from the carrier gas introduced from the carrier gas main pipe into the powder delivery pipe.

With this configuration, the fluidizing gas and the refluidizing gas can have unique functions different from that of the carrier gas. For example, reactive gas that reacts chemically with the powder may be used to introduce the powder resulting from the reaction into the powder delivery pipe.

A Powder supply method according to the present invention is a Powder supply method for supplying powder in a feed tank to outside of the feed tank via a valve for powder downstream of the feed tank and through a powder delivery pipe, the Powder supply method including: fluidizing the powder by fluidizing gas introduced from a powder fluidizing portion provided in the feed tank; refluidizing the powder by refluidizing gas introduced from a powder refluidizing portion provided between the powder fluidizing portion and the valve for powder; and introducing the refluidized powder into the valve for powder.

According to the Powder supply method, since the fluidized powder is refluidized when being introduced to the valve for powder, it is possible to introduce powder having high fluidity into the valve for powder. It is therefore possible to prevent the valve for powder from being obstructed and to stably supply the powder.

Furthermore, preferably, the valve for powder is provided in the powder delivery pipe, and the powder refluidizing portion is provided at a portion of the powder delivery pipe between the powder fluidizing portion and the valve for powder.

Even fluidized powder becomes lower in fluidity when entering the powder delivery pipe from the feed tank. Accordingly, when the valve for powder is provided in the powder delivery pipe, obstruction becomes more likely to occur in the valve for powder. According to the Powder supply method, since the powder is refluidized in the powder delivery pipe, it is therefore possible to prevent the valve for powder from being obstructed.

Furthermore, preferably, the powder refluidizing portion is connected to the valve for powder.

As a result of connecting the powder refluidizing portion to the valve for powder, the powder refluidizing portion and the valve for powder are adjacent to each other, and the distance between the powder refluidizing portion and the valve for powder can be minimized. Since powder having high fluidity can therefore be introduced through the valve for powder, it is possible to suitably prevent obstruction in the valve for powder and to supply powder more stably.

Preferably, the amount of the introduced refluidizing gas is determined on the basis of the aperture of the valve for powder.

As a result of determining the amount of the introduced refluidizing gas in this manner, it is possible to change the amount of the introduced refluidizing gas in accordance with the likeliness of occurrence of obstruction when the likeliness of occurrence of obstruction changes with the aperture of the valve for powder, and to more suitably prevent obstruction.

Preferably, the amount of the introduced refluidizing gas changes inversely with a change in the aperture of the valve for powder.

Specifically, a smaller amount of the refluidizing gas is introduced as the aperture of the valve for powder is larger while a larger amount of the refluidizing gas is introduced as the aperture of the valve for powder is smaller. As an example of such introduction of the refluidizing gas, the amount of the introduced refluidizing gas changes in inverse proportion to the aperture of the valve for powder. Since the likeliness of occurrence of obstruction in the valve for powder varies with the aperture of the valve for powder, it is possible to prevent an unnecessarily large amount of the refluidizing gas from being introduced by determining the amount of the introduced refluidizing gas on the basis of the aperture of the valve for powder.

Furthermore, it is preferable to introduce the carrier gas from the carrier gas main pipe connected to the powder delivery pipe into the powder delivery pipe in terms of easily conveying the powder.

Preferably, the fluidizing gas, the refluidizing gas, and the carrier gas are the same type of gas.

When the carrier gas, the fluidizing gas and the refluidizing gas are the same type of gas, it is not necessary to provide a plurality of types of gas and it is not necessary to take the properties of the respective types of gas into consideration, the carrier gas, the fluidizing gas, and the refluidizing gas can therefore be made to flow simply.

Preferably, part of the carrier gas is supplied as the fluidizing gas to the powder fluidizing portion and as the refluidizing gas to the powder refluidizing portion.

As a result of introducing the fluidizing gas and the refluidizing gas in this manner, one source of gas generation suffices, and the fluidizing gas and the refluidizing gas can be easily introduced.

Alternatively, preferably, the fluidizing gas and the refluidizing gas are a type of gas different from the carrier gas introduced from the carrier gas main pipe into the powder delivery pipe.

With this method, the fluidizing gas and the refluidizing gas can have unique functions different from that of the carrier gas. For example, reactive gas that reacts chemically with the powder may be used to introduce the powder resulting from the reaction into the powder delivery pipe.

Effect of the Invention

As described above, according to the present invention, a Powder supply apparatus and a Powder supply method capable of stably supplying powder are provided.

EMBODIMENT OF THE INVENTION

A preferred embodiment of a Powder supply apparatus and a Powder supply method according to the present invention will be described in detail below with reference to the drawings.

Figure 1:
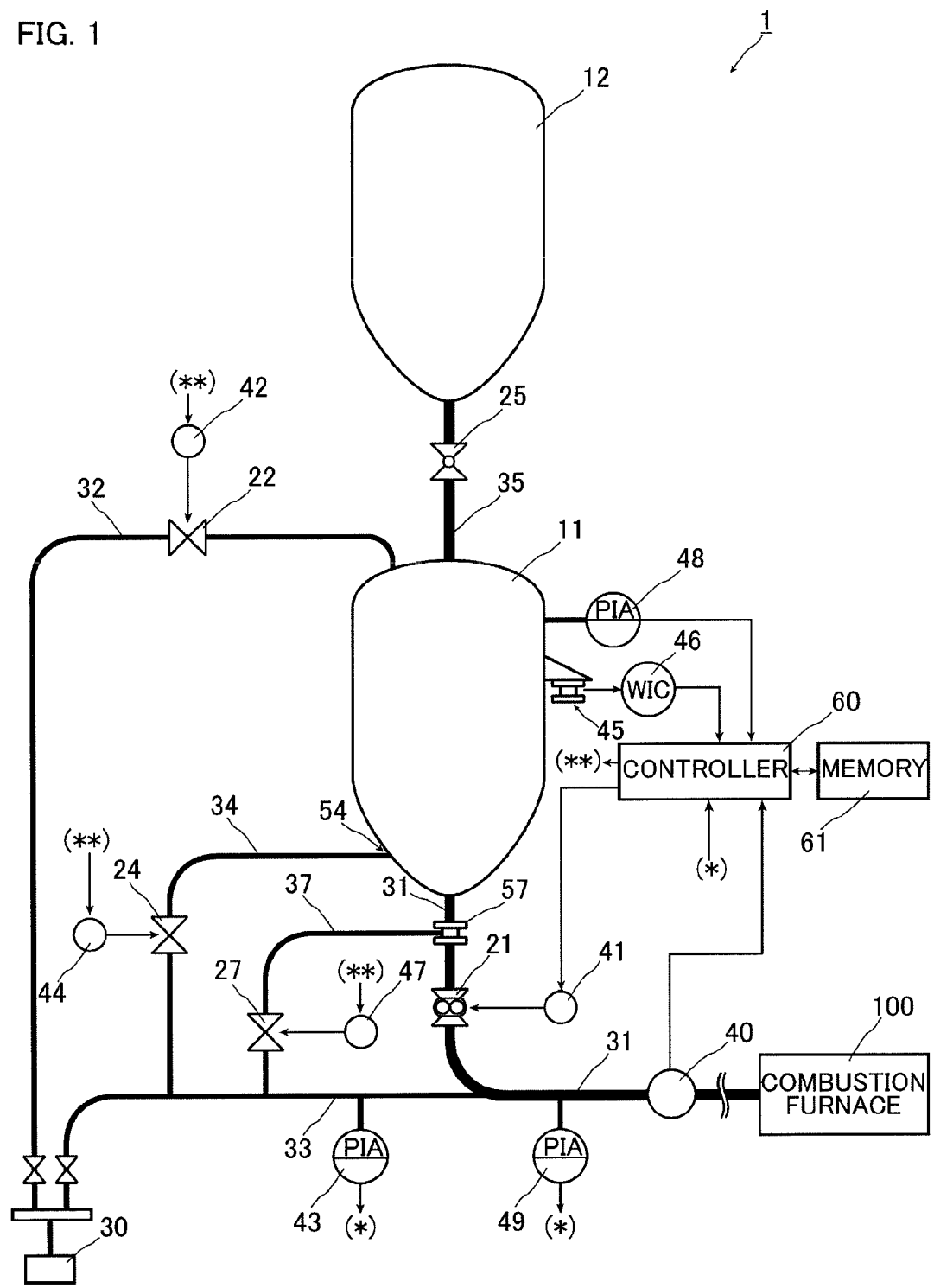
FIG. 1 is a diagram showing a Powder supply apparatus according to an embodiment of the present invention.

FIG. 1 is a diagram showing the Powder supply apparatus according to the embodiment of the present invention.

As shown in FIG. 1, the Powder supply apparatus 1 includes, as main components, a feed tank 11 for supplying a predetermined amount of pulverized fuel such as pulverized coal, a pressure equalizing tank 12 in which pulverized fuel to be fed to the feed tank 11 is stored, an internal pressure gas supply pipe 32 connected to the feed tank 11 and is configured to convey gas for internal pressure to be supplied into the feed tank 11, an internal pressure control valve 22 provided in the internal pressure gas supply pipe 32 and is configured to control the pressure in the feed tank 11, a powder fluidizing portion provided in the feed tank 11 and is configured to introduce fluidizing gas into the feed tank 11, a fluidizing gas pipe 34 connected to the powder fluidizing portion 54 and is configured to convey the fluidizing gas, a valve 24 for fluidizing gas provided in the fluidizing gas pipe 34, a powder delivery pipe 31 for conveying pulverized fuel fed from the feed tank 11, a valve 21 for powder connected to the powder delivery pipe 31 and is configured to control the amount of the pulverized fuel fed from the feed tank 11, a powder flowmeter 40 configured to detect the flow rate of the pulverized fuel conveyed in the powder delivery pipe 31, a powder refluidizing portion 57 provided between the valve 21 for powder and the powder fluidizing portion 54 and is configured to introduce refluidizing gas, a refluidizing gas pipe 37 connected to the powder refluidizing portion 57 and is configured to convey the refluidizing gas, and a valve 27 for refluidizing gas provided in the refluidizing gas pipe 37.

The feed tank 11 and the pressure equalizing tank 12 are tanks made of metal. The feed tank 11 is positioned below the pressure equalizing tank 12, and a powder supply pipe 35 connected to a bottom portion of the pressure equalizing tank 12 is connected to a top portion of the feed tank 11. The pulverized fuel is fed from the pressure equalizing tank 12 to the feed tank 11 via the powder supply pipe 35. Furthermore, the powder supply pipe 35 is provided with a powder supply valve 25 in a middle portion thereof, and supplying of the pulverized fuel from the pressure equalizing tank 12 to the feed tank 11 is controlled by opening and closing of the powder supply valve 25.

A load cell 45 is connected to the feed tank 11, and is configured to continuously detect the weight of the feed tank 11 put thereon. A weight indicator/controller 46 is connected to the load cell 45, and is configured to continuously measure the weight of the pulverized fuel in the feed tank 11 on the basis of the detection signal output from the load cell and output a signal containing information based on the weight of the pulverized fuel.

Furthermore, a pressure indicator 48 is connected to the feed tank 11, and is configured to detect the pressure in the feed tank 11 and output a signal containing information based on the pressure in the feed tank 11.

In addition, the powder delivery pipe 31 is connected to a bottom portion of the feed tank 11. The pulverized fuel fed from the feed tank 11 is introduced into the powder delivery pipe 31 from the feed tank 11 and conveyed by the powder delivery pipe 31 as described above.

As described above, the valve 21 for powder is connected to the middle portion of the powder delivery pipe 31 below the feed tank 11. Accordingly, the pulverized fuel fed from the feed tank 11 is conveyed by the powder delivery pipe 31 via the valve 21 for powder.

The valve 21 for powder is a ball valve made of a sphere in which a throughhole having a predetermined inner diameter is formed, a rotatable control valve made of a set of cylinders each having a notch in a side face thereof, and the like, the cylinders being arranged in a manner that the side faces are in contact with each other. The amount of the pulverized fuel fed from the feed tank 11 can be controlled to be within a predetermined range by adjusting the aperture of the valve 21 for powder. Since the valve 21 for powder is a valve through which powder passes, the flow rate of powder can be directly controlled. It is thus possible to change the powder flow rate greatly within a short time by adjusting the aperture of the valve for powder. Furthermore, a powder valve indicator 41 is connected to the valve 21 for powder, and is configured to adjust the aperture of the valve 21 for powder. Note that, in the present specification, when it is simply stated as "powder flow rate", this refers to the flow rate of powder in the powder delivery pipe.

Figure 2:
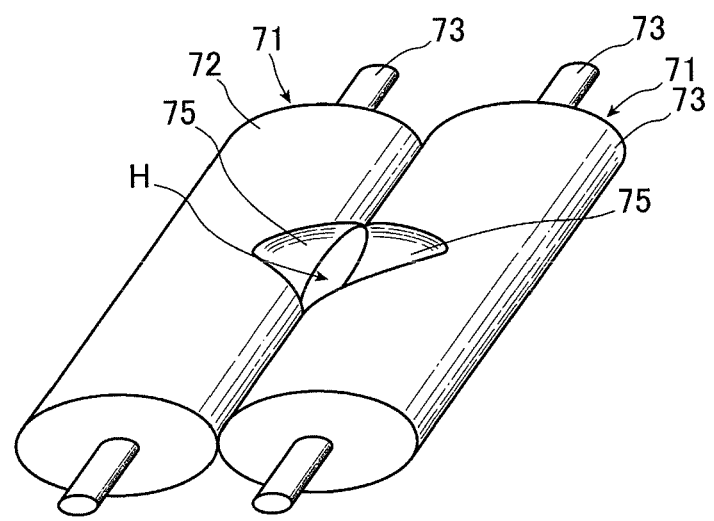
FIG. 2 is a view showing a structure of part of a valve for powder.
Figure 3:
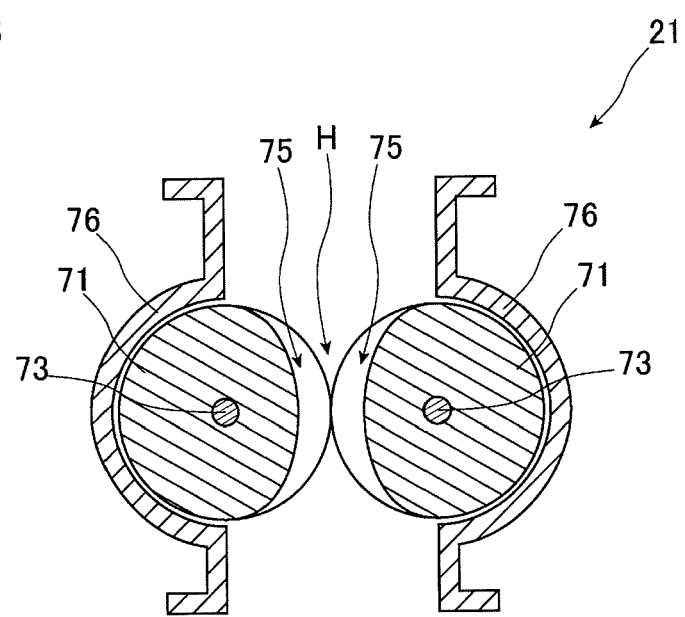
FIG. 3 is a view showing a cross-section structure of the valve for powder.

An example of the valve 21 for powder that is a rotatable control valve made of a set of cylinders each having a notch in a side face thereof, and the like, the cylinders being arranged in a manner that the side faces are in contact with each other, will be described here. FIG. 2 is a view showing a structure of part of the valve 21 for powder, and FIG. 3 is a view showing a cross-section structure of the valve 21 for powder. As shown in FIGS. 2 and 3, the valve 21 for powder includes, as main components, a valve casing 76, a set of substantially cylindrical valve elements 71 accommodated in the valve casing 76, and center shafts 73 axially penetrating the valve elements 71. In FIG. 3, the valve casing 76 is not shown for easy understanding.

Each of the valve elements 71 has a substantially cylindrical shape as described above, and a notch 75 is formed in each of side faces 72 of the valve elements 71. Furthermore, the center shafts 73 are provided along the axes of the respective valve elements 71. The valve elements 71 are arranged in a manner that the longitudinal directions thereof are parallel to each other, the side faces 72 thereof are in contact with each other, and the valve elements 71 are rotatable about the axes. The valve elements 71 are also structured such that the portions of the side faces 72 in which the notches 75 are formed can face each other when the valve elements 71 are rotated about the axes. Thus, as shown in FIGS. 2 and 3, in a state where the notches 75 face each other, a passage H is formed between the valve elements 71 because of the notches 75. Furthermore, the hole diameter of the passage H can be changed (the area of the passage H in a plane containing the center shafts 73 can be changed) by rotating the valve elements 71 about the axes. The passage H is a hole communicating with the feed tank 11, and the amount of the pulverized fuel fed from the feed tank 11 is adjusted by adjusting the hole diameter of the passage H.

As described above, the internal pressure gas supply pipe 32 to supply internal pressure gas for adjusting the pressure in the feed tank 11 is connected to the feed tank 11, and the internal pressure control valve 22 is provided in the internal pressure gas supply pipe 32. The amount of internal pressure gas supplied to the feed tank 11 is adjusted by adjusting the aperture of the internal pressure control valve 22. Furthermore, an internal pressure control valve indicator 42 is connected to the internal pressure control valve 22, and is configured to adjust the aperture of the internal pressure control valve 22.

A gas generator 30 is connected to one end of the internal pressure gas supply pipe 32 opposite to the end thereof on the side of the feed tank 11. Part of gas output from the gas generator 30 is introduced into the internal pressure gas supply pipe 32 and used as internal pressure gas.

A carrier gas main pipe 33 is also connected to the gas generator 30. The carrier gas main pipe 33 is a pipe for introducing carrier gas for conveying pulverized fuel into the powder delivery pipe 31. Thus, an end of the carrier gas main pipe 33 opposite to that on the side of the gas generator 30 is connected to the powder delivery pipe 31 described above at a position opposite to the feed tank 11 with respect to the valve 21 for powder. The pulverized fuel introduced into the powder delivery pipe 31 from the feed tank 11 via the valve 21 for powder is conveyed by the carrier gas introduced into the powder delivery pipe 31 from the carrier gas main pipe 33. Furthermore, a pressure indicator 43 is connected to the carrier gas main pipe 33, and is configured to detect the pressure in the carrier gas main pipe 33 and output a signal based on the pressure in the carrier gas main pipe 33.

Note that other part of the gas output from the gas generator 30 is introduced into the carrier gas main pipe 33. That is, the internal pressure gas and the carrier gas are the same gas species in the present embodiment.

Furthermore, the fluidizing gas pipe 34 is branched off from the carrier gas main pipe 33, and an end of the fluidizing gas pipe 34 opposite to that on the side of the branch point at the carrier gas main pipe 33 is connected to the bottom portion of the feed tank 11. In the present embodiment, the portion where the fluidizing gas pipe 34 is connected to the feed tank 11 is the powder fluidizing portion 54. Part of the carrier gas flowing through the carrier gas main pipe 33 is introduced as fluidizing gas into the fluidizing gas pipe 34, and the fluidizing gas is introduced into the feed tank 11 from below via the powder fluidizing portion 54. Since part of the carrier gas is used as the fluidizing gas as described above, the fluidizing gas and the carrier gas are the same gas species in the present embodiment. Furthermore, the fluidizing gas valve 24 is provided in the middle portion of the fluidizing gas pipe 34, and the amount of the fluidizing gas introduced into the feed tank 11 is adjusted by adjusting the aperture of the fluidizing gas valve 24. Furthermore, a fluidizing gas valve indicator 44 is connected to the fluidizing gas valve 24, and is configured to adjust the aperture of the fluidizing gas valve 24.

In addition, the refluidizing gas pipe 37 is branched off from the carrier gas main pipe 33 at a position different from that from which the fluidizing gas pipe 34 is branched off, and an end of the refluidizing gas pipe 37 opposite to that on the side of the branch point at the carrier gas main pipe 33 is connected to a portion of the powder delivery pipe 31 between the valve 21 for powder and the powder fluidizing portion 54. In the present embodiment, the portion where the refluidizing gas pipe 37 is connected between the valve 21 for powder and the powder fluidizing portion 54 is the powder refluidizing portion 57, from which the refluidizing gas is introduced into the powder delivery pipe 31. Although the powder refluidizing portion 57 and the valve 21 for powder are connected by the powder delivery pipe 31 in FIG. 1, the powder refluidizing portion 57 is preferably connected directly to the valve 21 for powder. In this manner, part of the carrier gas flowing through the carrier gas main pipe 33 is introduced as refluidizing gas into the refluidizing gas pipe 37, and the refluidizing gas is introduced between the valve 21 for powder and the powder fluidizing portion 54 via the powder refluidizing portion 57. As described above, the refluidizing gas pipe 37 is branched off from the carrier gas main pipe 33, and the refluidizing gas and the carrier gas are the same gas species in the present embodiment. Thus, all of the fluidizing gas, the refluidizing gas, and the carrier gas are the same gas species. Furthermore, the refluidizing gas valve 27 is provided in a middle portion of the refluidizing gas pipe 37, and the amount of the introduced refluidizing gas is adjusted by adjusting the aperture of the refluidizing gas valve 27. Furthermore, a refluidizing gas valve indicator 47 is connected to the refluidizing gas valve 27, and is configured to adjust the aperture of the refluidizing gas valve 27.

In addition, a pressure indicator 49 is connected to a portion of the powder delivery pipe 31 where the pulverized fuel is conveyed by the carrier gas, that is, a portion downstream of the position at the powder delivery pipe 31 to which the carrier gas main pipe 33 is connected, and is configured to detect the pressure in the powder delivery pipe 31 and output a signal containing information based on the pressure in the powder delivery pipe 31. The powder flowmeter 40 is further provided in the portion of the powder delivery pipe 31 where the pulverized fuel is conveyed by the carrier gas, and is configured to detect the flow rate of powder flowing through the powder delivery pipe 31 and output a signal containing the detected information.

In such a Powder supply apparatus, the pressure in the feed tank 11 is higher than the pressure in the carrier gas main pipe 33, and the pressure in the carrier gas main pipe 33 is higher than the pressure in the powder delivery pipe 31. The Powder supply apparatus 1 is configured to convey the pulverized fuel by utilizing the differential pressures between these pressures. These pressures are not particularly limited, but may be in a range of 2 MPa to 4 MPa, for example.

The differential pressure between the pressure in the feed tank 11 and the pressure in the carrier gas main pipe 33, the differential pressure between the pressure in the carrier gas main pipe 33 and the pressure in the powder delivery pipe 31, and the differential pressure between the pressure in the feed tank 11 and the pressure in the powder delivery pipe 31 can thus be adjusted by adjusting the pressure in the feed tank 11. As described above, since the Powder supply apparatus 1 conveys the pulverized fuel by utilizing the differential pressures, the flow rate of the pulverized fuel fed from the feed tank 11 can be also be adjusted by the differential pressures in addition to the aperture of the valve 21 for powder described above. In other words, the differential pressures can be adjusted by adjusting the pressure in the feed tank 11 with the aperture of the internal pressure control valve 22, and the flow rate of the pulverized fuel fed from the feed tank 11 can thus be adjusted. The powder flow rate of the pulverized fuel can be finely adjusted by controlling the differential pressures in this manner.

The Powder supply apparatus 1 further includes a controller 60 connected to a memory 61. The controller 60 is connected to the powder flowmeter 40, the pressure indicators 43, 48, and 49, and the weight indicator/controller 46, and receives as input a signal containing information on the powder flow rate output from the powder flowmeter 40, a signal containing information on the pressure in the carrier gas main pipe 33 output from the pressure indicator 43, a signal containing information on the pressure in the feed tank 11 output from the pressure indicator 48, a signal containing information on the pressure in the powder delivery pipe 31 output from the pressure indicator 49, a signal containing information on the weight of the pulverized fuel in the feed tank 11 output from the weight indicator/controller 46, and the like. The controller 60 then generates control signals as necessary on the basis of at least one of information in the memory 61 and the signal from the powder flowmeter 40 by using the signals from the pressure indicators 43, 48, and 49 and the signal output from the weight indicator/controller 46. The controller 60 is also connected to the powder valve indicator 41, the internal pressure control valve indicator 42, the fluidizing gas valve indicator 44, and the refluidizing gas valve indicator 47, and is configured to input the generated control signals to the powder valve indicator 41, the internal pressure control valve indicator 42, the fluidizing gas valve indicator 44, and the refluidizing gas valve indicator 47.

The powder valve indicator 41 is configured to adjust the aperture of the valve 21 for powder on the basis of a control signal from the controller 60. That is, when the controller 60 outputs a control signal on the basis of a signal from the powder flowmeter 40, the powder valve indicator 41 adjusts the aperture of the valve 21 for powder on the basis of the information from the powder flowmeter 40. In this case, the valve 21 for powder thus adjusts the powder flow rate according to the control signal from the controller 60 on the basis of the information from the powder flowmeter 40. When, on the other hand, the controller 60 outputs a control signal on the basis of information in the memory 61, the powder valve indicator 41 adjusts the aperture of the valve 21 for powder on the basis of the information from the memory 61. In this case, the valve 21 for powder thus adjusts the powder flow rate according to the control signal from the controller 60 on the basis of the information from the memory 61.

Furthermore, the internal pressure control valve indicator 42 is configured to adjust the aperture of the internal pressure control valve 22 on the basis of a signal from the controller 60. That is, when the controller 60 outputs a control signal on the basis of a signal from the powder flowmeter 40, the internal pressure control valve indicator 42 adjusts the aperture of the internal pressure control valve 22 on the basis of the information from the powder flowmeter 40. In this case, the internal pressure control valve 22 thus adjusts the powder flow rate according to the control signal from the controller 60 on the basis of the information from the powder flowmeter 40. When, on the other hand, the controller 60 outputs a control signal on the basis of information in the memory 61, the internal pressure control valve indicator 42 adjusts the aperture of the internal pressure control valve 22 on the basis of the information from the memory 61. In this case, the internal pressure control valve 22 thus adjusts the powder flow rate according to the control signal from the controller 60 on the basis of the information from the memory 61. Note that the controller 60 utilizes signals from the pressure indicators 43, 48, and 49 as necessary to generate a signal for adjusting the aperture of the internal pressure control valve 22.

Furthermore, the fluidizing gas valve indicator 44 is configured to adjust the aperture of the fluidizing gas valve 24 on the basis of a control signal from the controller 60. That is, when the controller 60 outputs a control signal on the basis of a signal from the powder flowmeter 40, for example, the fluidizing gas valve indicator 44 adjusts the aperture of fluidizing gas valve on the basis of the information from the powder flowmeter 40. In this case, the fluidizing gas valve 24 thus adjusts the amount of introduced fluidizing gas according to the control signal from the controller 60 on the basis of the information from the powder flowmeter 40. When, on the other hand, the controller 60 outputs a control signal on the basis of information in the memory 61, the fluidizing gas valve indicator 44 adjusts the aperture of the fluidizing gas valve 24 on the basis of the information from the memory 61. In this case, the fluidizing gas valve 24 thus adjusts the amount of introduced fluidizing gas according to the control signal from the controller 60 on the basis of the information from the memory 61.

Furthermore, the refluidizing gas valve indicator 47 is configured to adjust the aperture of the refluidizing gas valve 27 on the basis of a signal from the controller 60. In the present embodiment, when the controller 60 outputs a control signal on the amount of introduced refluidizing gas on the basis of the aperture of the valve for powder, the refluidizing gas valve indicator 47 adjusts the aperture of the refluidizing gas valve 27 on the basis of the aperture of the valve 21 for powder. In this case, the refluidizing gas valve 27 thus adjusts the amount of introduced refluidizing gas according to the control signal from the controller 60 on the basis of the aperture of the valve 21 for powder. Note that, in this case, the control signal on the basis of the aperture of the valve 21 for powder output from the controller 60 is generated by the controller 60 in association with the control signal to be output to the powder valve indicator by the controller 60. When, on the other hand, the controller 60 outputs a control signal on the basis of information in the memory 61, the refluidizing gas valve indicator 47 adjusts the aperture of the refluidizing gas valve 27 on the basis of the information from the memory 61. For example, when the aperture of the valve 21 for powder and the amount of introduced refluidizing gas are stored in the memory 61, the controller 60 generates a control signal for adjusting the aperture of the refluidizing gas valve 27 from the information in the memory 61 once the aperture of the valve 21 for powder is determined, and transmits the control signal to the refluidizing gas valve indicator 47. In this case, the refluidizing gas valve 27 thus adjusts the amount of introduced refluidizing gas according to the control signal from the controller 60 on the basis of the information from the memory 61.

The memory 61 stores therein a table showing the relation between the powder flow rate, the aperture of the valve 21 for powder and the differential pressure between any two of the pressures in the feed tank 11, the carrier gas main pipe 33, and the powder delivery pipe 31, and a table showing the relation between the aperture of the valve 21 for powder and the aperture of the refluidizing gas valve 27, for example. When the valve 21 for powder adjusts the powder flow rate on the basis of the information from the memory 61, a control signal for adjusting the aperture of the valve 21 for powder is generated by the controller 60 on the basis of the information indicating the aperture of the valve 21 for powder from the memory 61, and input to the powder valve indicator 41. When the internal pressure control valve 22 adjusts the powder flow rate on the basis of the information from the memory 61, for example, a control signal for adjusting the aperture of the internal pressure control valve 22 is generated by the controller 60 on the basis of information from at least two of the pressure indicators 43, 48, and 49 and information from the memory 61 indicating the differential pressure between any two of the pressures in the feed tank 11, the carrier gas main pipe 33, and the powder delivery pipe 31 once the differential pressure is determined, and input to the internal pressure control valve indicator 42. The tables in the memory 61 are obtained in advance through experiments or the like and recorded in the memory 61.

In the Powder supply apparatus 1, the powder delivery pipe 31 is directly or indirectly connected to a combustion furnace 100 for burning the pulverized fuel to extract energy.

Next, operation of the Powder supply apparatus 1 will be described.

First, the powder supply valve 25 is opened to supply pulverized fuel from the pressure equalizing tank 12 to the feed tank 11 via the powder supply pipe 35.

Then, the fluidizing gas valve 24 is opened, to introduce fluidizing gas from the fluidizing gas pipe 34 into the feed tank 11 via the powder fluidizing portion 54. As a result of introducing the fluidizing gas into the feed tank 11, the pulverized fuel in the feed tank 11 is fluidized to be a state that can be easily fed from the feed tank 11 into the powder delivery pipe 31. The pulverized fuel is then fed from the feed tank 11 to the powder delivery pipe owing to the differential pressure between the pressure in the feed tank 11 and the pressure in the powder delivery pipe 31.

Furthermore, the refluidizing gas valve 27 is opened to introduce refluidizing gas from the powder refluidizing portion 57 via the refluidizing gas pipe 37 so that the pulverized fuel does not obstruct the passage H in the valve 21 for powder, and the pulverized fuel is thus refluidized between the valve 21 for powder and the powder fluidizing portion 54. As described above, the powder refluidizing portion 57 is provided at a portion of the powder delivery pipe 31 between the powder fluidizing portion 54 and the valve 21 for powder in the present embodiment. The fluidity of the pulverized fuel is lowered when the pulverized fuel enters the powder delivery pipe 31 from the feed tank 11, and obstruction becomes likely to occur in the valve 21 for powder. Since, however, the powder is refluidized in the powder delivery pipe 31, it is possible to prevent the valve 21 for powder from being obstructed. Although the powder refluidizing portion 57 and the valve 21 for powder are connected by the powder delivery pipe 31 in the present embodiment, it is preferable that the powder refluidizing portion 57 be connected to the valve 21 for powder because the pulverized fuel will be refluidized immediately above the valve 21 for powder and the refluidized pulverized fuel will be introduced into the valve 21 for powder, which makes it easier for the pulverized fuel to pass through the passage H in the valve 21 for powder.

Then, information on a set value SV of the powder flow rate is input by an operator through input means. Note that the input means is not shown in FIG. 1. The input information is input to the controller 60, and the controller 60 refers to the memory 61 to read out the aperture of the valve 21 for powder associated with the information on the input set value SV of the powder flow rate and the differential pressure between any two of the pressures in the feed tank 11, the carrier gas main pipe 33, and the powder delivery pipe 31.

Subsequently, the controller 60 generates a control signal on the aperture of the valve 21 for powder on the basis of the information in the memory 61, and transmits the control signal to the powder valve indicator 41. The powder valve indicator 41 adjusts the aperture of the valve 21 for powder on the basis of the control signal from the controller 60. In this manner, the initial aperture of the valve 21 for powder is adjusted on the basis of the information from the memory 61.

In this case, the amount of the introduced refluidizing gas is determined on the basis of the aperture of the valve 21 for powder as described above, and in the present embodiment, the amount of the introduced refluidizing gas changes inversely with the change in the aperture of the valve 21 for powder. Specifically, as the aperture of the valve 21 for powder increases, the aperture of the refluidizing gas valve 27 becomes smaller according to the control signal from the controller 60 and the amount of the introduced refluidizing gas becomes smaller. In other words, the amount of the introduced refluidizing gas is controlled to be in inverse proportion to the aperture of the valve 21 for powder. This is due to the following reason. In general, obstruction by the pulverized fuel is likely to occur when the aperture of the valve 21 for powder is small while obstruction by the pulverized fuel is less likely to occur when the aperture of the valve 21 for powder is large. Accordingly, in a state in which the aperture of the valve 21 for powder is small where obstruction by the pulverized fuel is likely to occur, the amount of the introduced refluidizing gas is increased, while in a state in which the aperture of the valve 21 for powder is large where the obstruction by the pulverized fuel is less likely to occur, the amount of the introduced refluidizing gas is decreased. In this manner, it is possible to prevent an unnecessarily large amount of refluidizing gas from being introduced by determining the amount of the introduced refluidizing gas on the basis of the aperture of the valve for powder.

Furthermore, the controller 60 refers to information in the memory 61 and information from at least two of the pressure indicators 43, 48, and 49 to generate a control signal on the aperture of the internal pressure control valve 22, and transmits the control signal to the internal pressure control valve indicator 42. The internal pressure control valve indicator 42 adjusts the aperture of the internal pressure control valve 22 on the basis of the control signal from the controller 60. As a result of adjusting the aperture of the internal pressure control valve 22, the initial differential pressure between any two of the pressures in the feed tank 11, the carrier gas main pipe 33, and the powder delivery pipe 31 becomes within a predetermined range and adjusted to be constant. When a differential pressure in a table in the memory 61 is different from an actual differential pressure owing to the environment in which the Powder supply apparatus 1 is used, the state of the pulverized fuel, or the like, the controller 60 generates a control signal on the aperture of the internal pressure control valve 22 again so that the differential pressure becomes constant on the basis of information from at least two of the pressure indicators 43, 48, and 49 and transmits the control signal to the internal pressure control valve indicator 42. The aperture of the internal pressure control valve 22 is then adjusted again so that the differential pressure becomes constant. In other words, when a differential pressure in a table in the memory 61 is different from an actual differential pressure, it is preferable that the internal pressure control valve 22 be provided with feedback of information from at least two of the pressure indicators 43, 48, and 49 and that the aperture of the internal pressure control valve 22 be adjusted again so that any of the differential pressure between the pressure in the feed tank 11 and the pressure in the carrier gas main pipe 33, the differential pressure between the pressure in the carrier gas main pipe 33 and the pressure in the powder delivery pipe 31, and the differential pressure between the pressure in the feed tank 11 and the pressure in the powder delivery pipe 31 becomes constant. As a result of the adjustment in this manner, the differential pressure is more accurately adjusted.

Figure 4:
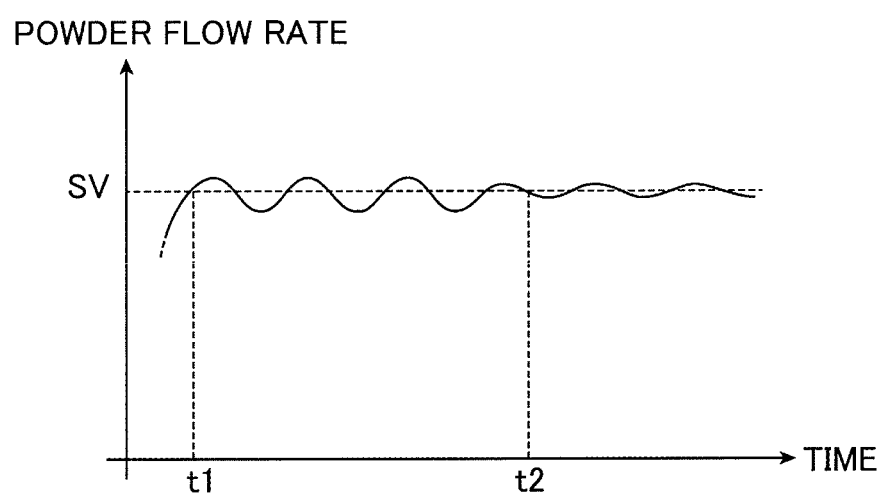
FIG. 4 is a graph showing variation of a powder flow rate with time.

FIG. 4 is a graph showing variation of the flow rate of powder conveyed in the powder delivery pipe 31 with time. As shown in FIG. 4, when the initial aperture of the valve 21 for powder is adjusted and the differential pressure is adjusted to be constant by the internal pressure control valve 22, the flow rate of powder conveyed in the powder delivery pipe 31 quickly becomes closer to the set value SV at time t1.

Subsequently, in a state in which the differential pressure is adjusted to be constant, the aperture of the valve 21 for powder is adjusted so that the powder flow rate becomes constant on the basis of information from the powder flowmeter 40. Specifically, even if the aperture of the valve 21 for powder and the differential pressure between any two of the pressures in the feed tank 11, the carrier gas main pipe 33, and the powder delivery pipe 31 are adjusted on the basis of information in the memory 61, the flow rate of powder conveyed through the powder delivery pipe 31 always vary owing to the influence by the combustion furnace 100, the state of the pulverized fuel, and the like. The aperture of the valve 21 for powder is therefore adjusted so as to cancel out the variation on the basis of information from the powder flowmeter 40, whereby the powder flow rate is kept within a predetermined range. Since the powder flow rate is adjusted to be constant by means of the valve 21 for powder in this manner, it is possible to control the powder flow rate in a short time even when the powder flow rate varies greatly. Even in this case, since the amount of the introduced refluidizing gas is determined on the basis of the aperture of the valve for powder as described above, the amount of the introduced refluidizing gas is controlled to be in inverse proportion to the aperture of the valve 21 for powder.

Subsequently, at t2 when the powder flow rate becomes within the predetermined range, the aperture of the valve for powder becomes constant. Then, the differential pressure between any two of the pressures in the feed tank 11, the carrier gas main pipe 33, and the powder delivery pipe 31 is adjusted. Specifically, the controller 60 generates a control signal to adjust the aperture of the internal pressure control valve 22 so that the differential pressure is adjusted to cancel out the variation in the powder flow rate on the basis of the information from the powder flowmeter 40, and transmits the control signal to the internal pressure control valve indicator 42. The aperture of the internal pressure control valve 22 is therefore adjusted by the internal pressure control valve indicator 42 on the basis of the information from the powder flowmeter, by which the pressure in the feed tank 11 is adjusted, and as a result, the differential pressure is adjusted. In this manner, the flow rate of powder conveyed in the powder delivery pipe 31 is adjusted to be closer to the set value SV by means of the differential pressure. Adjustment of the powder flow rate by adjusting the differential pressure as shown in FIG. 4 can be fine adjustment. After t2, the range of variation in the powder flow rate with respect to the set value is smaller as a result of adjusting the differential pressure.

In this manner, powder at a flow rate in a small range of variation is fed to the combustion furnace 100.

As described above, according to the Powder supply apparatus 1 according to the present embodiment, the pulverized fuel fluidized by the fluidizing gas is refluidized by the refluidizing gas before entering the valve 21 for powder. It is therefore possible to prevent the passage H in the valve 21 for powder from being obstructed by the pulverized fuel. Thus, according to the Powder supply apparatus 1, pulverized fuel can be stably fed.

Furthermore, in the present embodiment, since part of the carrier gas is used as the fluidizing gas and the refluidizing gas, one gas generator 30 suffices as the source of gas generation, which can simplify the structure of the Powder supply apparatus 1.

While the present invention has been described above by reference to the embodiment as an example, the present invention is not limited thereto.

For example, in the embodiment described above, the powder refluidizing portion 57 is provided at a portion of the powder delivery pipe 31 between the powder fluidizing portion 54 and the valve 21 for powder. The present invention, however, is not limited thereto, and the powder refluidizing portion 57 may be provided at a portion of the feed tank 11 between the powder fluidizing portion 54 and the valve 21 for powder.

Furthermore, in the embodiment described above, the amount of the introduced refluidizing gas is determined on the basis of the aperture of the valve 21 for powder and changes inversely with the change in the aperture of the valve 21 for powder. The present invention, however, is not limited thereto, and the amount of the introduced refluidizing gas need not change inversely with the change in the aperture of the valve 21 for powder. For example, if the aperture of the valve 21 for powder is larger than a predetermined aperture, the amount of the introduced refluidizing gas may be changed inversely with the change in the aperture of the valve 21 for powder, while if the aperture of the valve 21 for powder is smaller than the predetermined aperture, a predetermined amount of the refluidizing gas may be introduced regardless of the aperture of the valve 21 for powder. Alternatively, the amount of the introduced refluidizing gas need not be determined on the basis of the aperture of the valve 21 for powder, but may be constant regardless of the aperture of the valve 21 for powder.

Furthermore, part of the carrier gas is used as the fluidizing gas and the refluidizing gas in the embodiment described above, but the present invention is not limited thereto. For example, the carrier gas may include a plurality of types of gas, the fluidizing gas and the refluidizing gas may be some types of gas included in the carrier gas, and the fluidizing gas and the refluidizing gas may be introduced into the powder delivery pipe 31 and used as part of the carrier gas. That is, the carrier gas output from the gas generator 30 and the fluidizing gas and the refluidizing gas may be different gases, and the fluidizing gas and the refluidizing gas may be output from another gas generator different from the gas generator 30. The fluidizing gas and the refluidizing gas are then introduced from the feed tank 11 into the powder delivery pipe 31, the carrier gas output from the gas generator 30 is further introduced into the powder delivery pipe 31, and as a result, the carrier gas for conveying the pulverized fuel includes a plurality of types of gas. In this case, the fluidizing gas and the refluidizing gas can have unique functions. For example, reactive gas that reacts chemically with the pulverized fuel may be used to convey the pulverized fuel resulting from the reaction through the powder delivery pipe.

Furthermore, while the Powder supply apparatus for supplying powder that is pulverized fuel has been described in the embodiment, the present invention is not limited thereto and can be applied to a Powder supply apparatus for supplying powder other than the pulverized fuel.

INDUSTRIAL APPLICABILITY

As described above, according to the present invention, a Powder supply apparatus and a powder delivery method capable of supplying powder stably can be provided, which can be applied to a Powder supply apparatus for stably supplying pulverized fuel to a combustion furnace used in a blast furnace facility, a thermal power plant, or the like.

DESCRIPTION OF REFERENCE NUMERALS

1 . . . Powder feeding system
11 . . . feed tank
12 . . . pressure equalizing tank
21 . . . valve for powder
22 . . . internal pressure control valve
24 . . . fluidizing gas valve
25 . . . powder feed valve
27 . . . refluidizing gas valve
30 . . . gas generator
31 . . . powder delivery pipe
32 . . . internal pressure gas supply pipe
33 . . . carrier gas main pipe
34 . . . fluidizing gas pipe
35 . . . powder feed pipe
37 . . . refluidizing gas pipe
40 . . . powder flowmeter
41 . . . powder valve indicator
42 . . . internal pressure control valve indicator
43 . . . pressure indicator
44 . . . fluidizing gas valve indicator
45 . . . load cell
46 . . . weight indicator/controller
47 . . . refluidizing gas valve indicator
48 . . . pressure indicator
49 . . . pressure indicator
54 . . . powder fluidizing portion
57 . . . powder refluidizing portion
60 . . . controller
61 . . . memory
71 . . . valve element
72 . . . side face
73 . . . center shaft
75 . . . notch
76 . . . valve casing
100 . . . combustion furnace
H . . . passage

The invention claimed is:

1. A powder feeding system for feeding powder in a feed tank to outside of the feed tank via a valve for powder downstream of the feed tank and through a powder delivery pipe, the powder feeding system comprising:
  a powder fluidizing portion provided in the feed tank and configured to introduce fluidizing gas for fluidizing the powder;
  a powder refluidizing portion provided between the powder fluidizing portion and the valve for powder and configured to introduce refluidizing gas for refluidizing the powder; and
  a controller capable of controlling the amount of introduced refluidizing gas;
  wherein the valve for powder is the powder delivery pipe between the powder fluidizing portion and the valve for powder;
  wherein the controller is configured to control an amount of the introduced refluidizing gas determined on a basis of the size of the opening of an aperture of the valve for powder.

2. The powder feeding system according to claim 1, wherein the powder refluidizing portion is connected to the valve for powder.

3. The powder feeding system according to claim 1, wherein the amount of the introduced refluidizing gas changes inversely with a change in the size of the opening of the aperture of the valve for powder.

4. The powder feeding system according to claim 1, further comprising a carrier gas supply configured to introduce carrier gas into the powder delivery pipe.

5. The powder feeding system according to claim 4, wherein the fluidizing gas, the refluidizing gas, and the carrier gas are the same type of gas.

6. The powder feeding system according to claim 5, wherein part of the carrier gas is supplied as the fluidizing gas to the powder fluidizing portion and as the refluidizing gas to the powder refluidizing portion.

7. The powder feeding system according to claim 4, wherein the fluidizing gas and the refluidizing gas are a type of gas different from the carrier gas introduced from the carrier gas main pipe into the powder delivery pipe.

* * * * *